United States Patent
Collins, Jr.

(10) Patent No.: US 12,295,534 B1
(45) Date of Patent: May 13, 2025

(54) COUPLING APPARATUS FOR CLEANING APPARATUSES

(71) Applicant: Ronald B Collins, Jr., Castle Rock, MN (US)

(72) Inventor: Ronald B Collins, Jr., Castle Rock, MN (US)

( * ) Notice: Subject to any disclaimer, the term of this patent is extended or adjusted under 35 U.S.C. 154(b) by 516 days.

(21) Appl. No.: 17/585,376

(22) Filed: Jan. 26, 2022

Related U.S. Application Data

(60) Provisional application No. 63/206,082, filed on Jan. 26, 2021.

(51) Int. Cl.
*A47L 13/42* (2006.01)
*A47L 13/24* (2006.01)
*F16B 5/02* (2006.01)

(52) U.S. Cl.
CPC .............. *A47L 13/42* (2013.01); *A47L 13/24* (2013.01); *F16B 5/0216* (2013.01)

(58) Field of Classification Search
CPC ......... A47L 13/42; A47L 13/24; F16B 5/0216
See application file for complete search history.

(56) References Cited

U.S. PATENT DOCUMENTS

| | | | | |
|---|---|---|---|---|
| 1,672,890 A | * | 6/1928 | Johnson | A47L 13/24 15/229.8 |
| 2,635,272 A | * | 4/1953 | Johnson | A47L 13/24 15/118 |
| 2,756,453 A | * | 7/1956 | Mattson | A47L 13/24 294/119 |
| 2,890,470 A | * | 6/1959 | Schaefer | A47L 13/24 15/221 |
| 3,031,707 A | * | 5/1962 | Wiley | A47L 13/24 403/150 |
| 4,800,609 A | * | 1/1989 | Peck | A47L 13/24 15/210.1 |
| 2007/0071540 A1 | * | 3/2007 | Jung | B25G 3/38 401/270 |
| 2009/0025169 A1 | * | 1/2009 | Warning | B25G 3/06 15/229.6 |

FOREIGN PATENT DOCUMENTS

| | | | | |
|---|---|---|---|---|
| CN | 106562733 A | * | 4/2017 | |
| CN | 107736850 A | * | 2/2018 | ........... A47L 13/258 |
| CN | 109091090 A | * | 12/2018 | |
| CN | 112641408 A | * | 4/2021 | ............ A47L 13/08 |
| DE | 10235308 A1 | * | 2/2004 | ............ A47L 13/20 |
| FR | 2752717 A1 | * | 3/1998 | ............ A46B 5/002 |
| KR | 20110064588 A | * | 6/2011 | |
| SE | 504242 C2 | * | 12/1996 | ............ A47L 13/24 |
| SE | 521226 C2 | * | 10/2003 | ............ A47L 13/24 |

OTHER PUBLICATIONS

SE-504242-C2—English Machine Translation (Year: 1996).*

* cited by examiner

*Primary Examiner* — Marc Carlson
(74) *Attorney, Agent, or Firm* — Barry Choobin; Patent 360

(57) ABSTRACT

A coupling apparatus for joining two cleaning mops together for quickly cleaning a given floor area. The cleaning apparatus has two assemblies mounted to two cleaning mops respectively, and an elongated bar connects to the two assembles. Each assembly has a top plate and a bottom plate secured to the cleaning mop using a pair of fasteners. Each assembly has a pot magnet secured to one of the two fasteners.

14 Claims, 5 Drawing Sheets

COUPLING APPARATUS FOR CLEANING APPARATUSES

CROSS-REFERENCE TO RELATED APPLICATIONS

This application claims priority from the U.S. provisional patent application Ser. No. 63/206,082, filed on Jan. 26, 2021, which is incorporated herein by reference in its entirety.

FIELD OF INVENTION

The present invention relates to a coupling apparatus for cleaning apparatuses, and more particularly, the present invention relates to coupling apparatus for linking two cleaning mops together.

BACKGROUND

Cleaning the floors is an essential activity and routine in everyday life. Whether it is a home, office, or any public place, everybody likes clean and hygienic surroundings. Hygienic surroundings are not only pleasing to the eye, but also prevent the spread of germs, dust, and contaminants. However, the cleaning job itself is laborious and time-consuming. Mops are used to clean large floor areas, such as those in public places, halls, auditoriums, platforms, and the like. A mop has a long handle and an elongated rectangular cleaning head attached to an end of the long handle. A person can grab the mop at the free end of the long handle and push the cleaning head over the floor to wipe the floor. Available cleaning mops are satisfactory for small places; however, the efficiency becomes a limitation for larger floor areas. Specifically, when the floor must be wiped in quick time, the available mops may be unsatisfactory.

Thus, a need is appreciated for a coupling apparatus that allows two or more mops to be joined together.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a coupling apparatus for linking two cleaning mops together.

It is another object of the present invention that the cleaning efficiency can be improved.

It is still another object of the present invention that a given floor area can be cleaned faster in less time.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
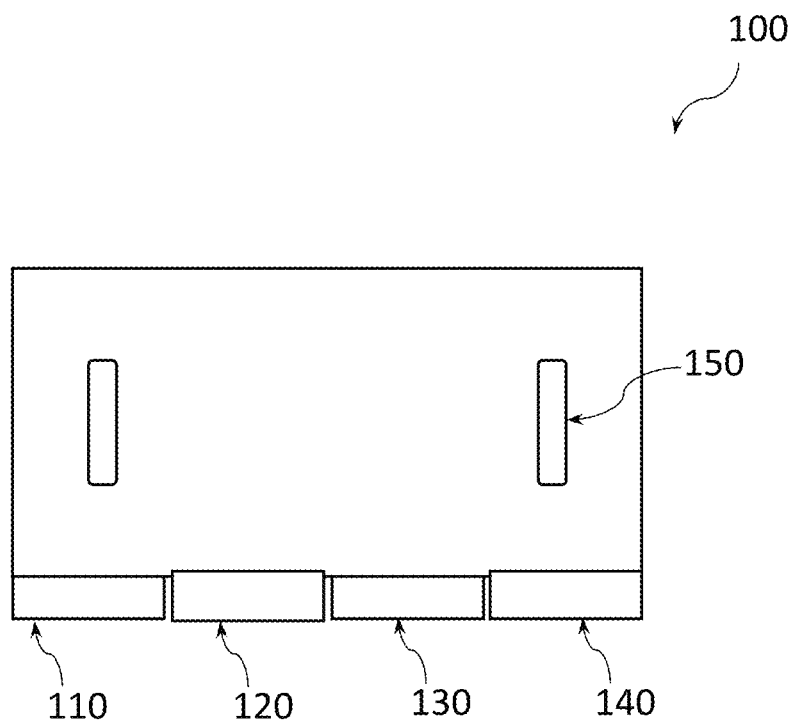
FIG. 1 shows a top plate of the coupling apparatus for cleaning mops, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a coupling apparatus for linking or joining two cleaning mops together, and more specifically linking the cleaning heads of the two mops. Joining the two mops increases the overall cleaning area, thus with the same effort and time, a user can now clean the floor at twice the rate. The two mop heads can be joined side by side along a longitudinal axis to double the cleaning surface area such that a single person can clean more floor area in a given time duration, thus increasing the efficiency. The mop heads can be pivoted up to 180 degrees for desired cleaning efficiency. For example, a second cleaning head of the two mops can be turned 90 degrees to clean an edge of a wall. Pivoting the second cleaning head at 180 degrees can result in the two cleaning heads being parallel to each other, thus the same floor area can be cleaned twice by the action of the two cleaning heads.

Figure 2:
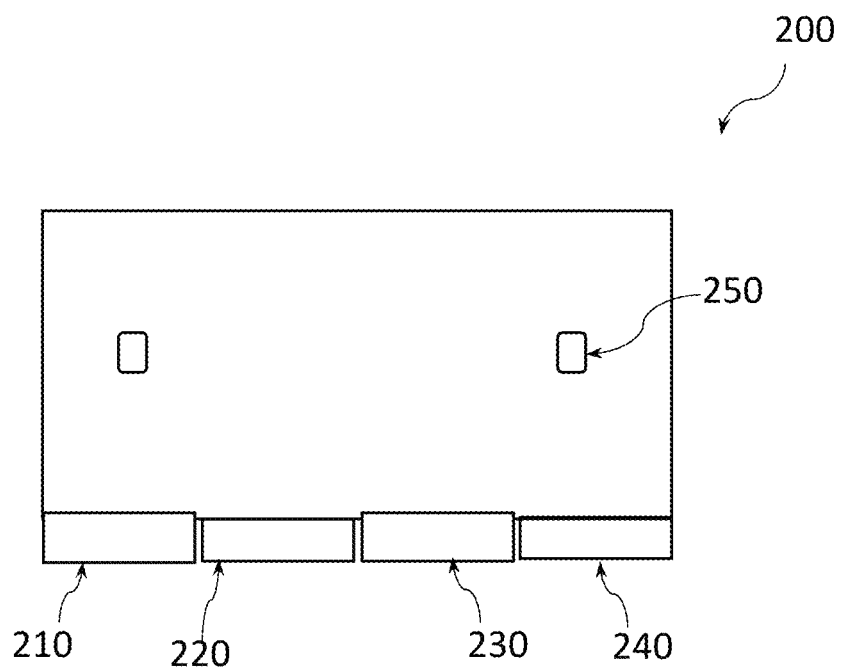
FIG. 2 shows a bottom plate of the coupling apparatus, according to an exemplary embodiment of the present invention.

Referring to FIG. 1, which shows an exemplary embodiment of a top plate 100 of the disclosed coupling apparatus, and FIG. 2 which shows a bottom plate 200 of the coupling apparatus. The top plate 100 can include a first flange 110, a second flange 120, a third flange 130, and a fourth flange 140. The first flange 110 can bend upwards substantially perpendicular to the top plate 100 and then a top portion of the first flange 110 can again bend outwards and away from the top plate such that to be parallel to the top plate. The second flange 120 can bend downwards and a top portion of the second flange can bend away and parallel to the top plate. The third flange 130 is of the same geometrical profile as the first flange 110. The fourth flange 140 can be the same as the second flange 120. It is understood that the number of flanges shown in FIG. 1 is four, however, any even number of flanges are within the scope of the present invention and the even number of flanges can be arranged similarly i.e., up and down. The top plate can further have two elongated slots 150. The flanges can be provided on the front side of the top plate and the two elongated slots can extend between the front side and the rear side of the top plate Referring to FIG. 2 which shows the exemplary embodiment of the bottom plate 200 which can also have a first flange 210, a second flange 220, a third flange 230, and a fourth flange 240. The arrangement and the geometry of the flanges of the bottom plate can be similar to that of the top plate 100. The bottom plate 200 can be provided with two small slots that can receive two fasteners. The coupling apparatus can include two top plates and two bottom plates, one top plate, and one bottom plate for each of the two mop heads.

Figure 3:
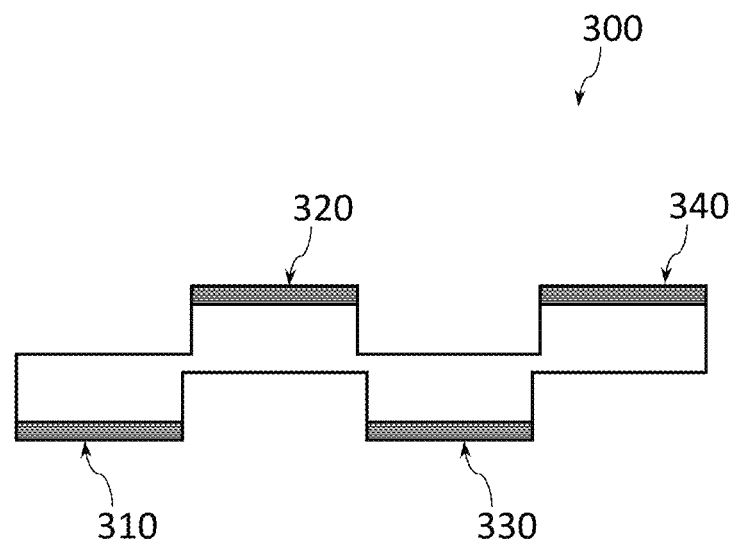
FIG. 3 shows a front view of the top plate and the bottom plate of the coupling apparatus, according to an exemplary embodiment of the present invention.
Figure 4:
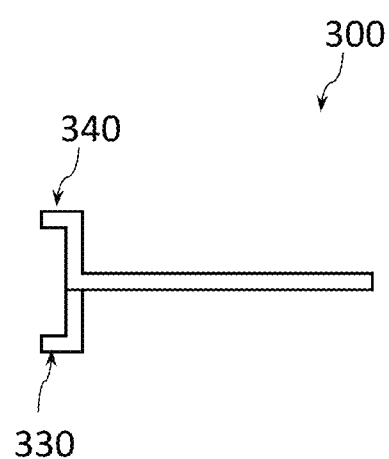
FIG. 4 shows a side view of the top plate and the bottom plate of the coupling apparatus, according to an exemplary embodiment of the present invention.

Referring to FIG. 3 which shows a front side of a plate 300 which can be the top plate or the bottom plate. FIG. 4 shows a side view of plate 300. FIG. 3 illustrates the geometrical profile of the four flanges 310, 320, 330, and 340. The dark portion in the four flanges shows the tip portion. The tip portion of the flanges can be more clearly seen in FIG. 4. The fourth flange 340 can be seen bend upwards 90 degrees relative to a plane of plate 300. The tip portion of the flange 340 can be seen bent 90 degrees to be parallel to the plane of plate 300. The flange adjacent to the fourth flange 340 i.e., the third flange 330 can be seen extended downwards 90 degrees relative to the plate, and the top portion of the third flange 330 extended outwards to be parallel to the plane of the plate 300. All the tip portions of the four flanges can be parallel to each other. It is understood that the flanges are shown parallel for illustration purposes only, however, the flanges and the tip portions can bend slightly upwards or downward away from the 90-degree angle without departing from the scope of the present invention.

In one exemplary embodiment, the top plate and the bottom plate can be made from a metal sheet, such as about 20 Gauze galvanized metal sheets. Each of the top plate and the bottom plate can measure about 4 inches by 6 inches. The flanges can be of equal width that spans across the front side of the plate. For example, the flanges can be provided at 1.5-inch, 3 inches, and 4.5 inches. Each flange can be of a length of about ⅜ inches and the tip portion of each flange can be about 3/16 inches from the top edges of the flanges.

Figure 5:
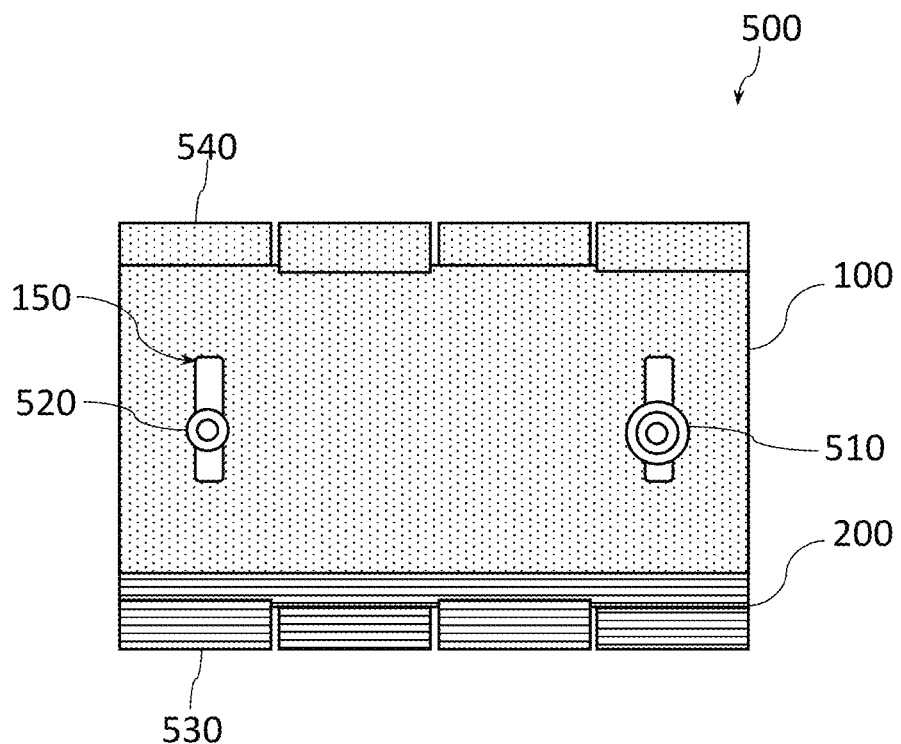
FIG. 5 shows a top view of the fastened top plate and the bottom plate using fasteners, also shown in a pot magnet, according to an exemplary embodiment of the present invention.
Figure 6:
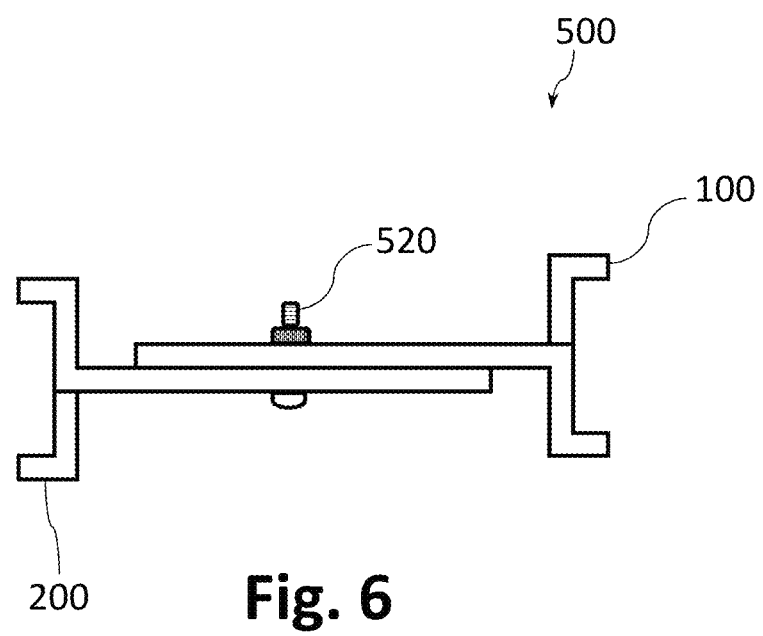
FIG. 6 is a side view of the top plate fastened to the bottom plate as in FIG. 5, according to an exemplary embodiment of the present invention.

Referring to FIG. 5 which shows an assembly 500 of the top plate 100 and the bottom plate 200 fastened to each other by a pair of fasteners 520. The top plate 100 can be at the top and the bottom plate 200 can be at the bottom. A fastener, such as a nut and a bolt can be used to fasten the two plates together as shown in FIGS. 5 and 6. A portion of the top plate and the bottom plate can overlap such as the slots of the bottom plate can be below the elongated slots of the top plate. A bolt can be inserted into the slot of the bottom plate, wherein the bolt can pass through the slots of the top plate and the bottom plate to protrude out from the elongated slot of the top plate. A nut can be used to secure the bolt for fastening the top plate to the bottom plate. To adjust the positioning of the top plate relative to the bottom plate, while keeping the nut loose, the top plate can slide forward and backwards up to a length of the elongated slots. Once, the desired position is reached, the nut can be tightened to make the top plate immobile on the bottom plate. The length of the elongated slots provides a free play to the top plate so that the position of the top plate can be adjusted and readjusted. The head of the bolt can be retained by the bottom plate while the nut can be above the top plate. Four such fasteners may be required for the two sets of the plates, such as four carriage bolts having square heads ¼-20 1" inches can be used. However, any other fastener known to a skilled person for fastening the two plates can be used without departing from the scope of the present invention. Also, it is to be noted that opposite flanges in the top plate and the bottom plate when assembles extend in the opposite direction. For example, the assembly 500 shows the first flange 530 of bottom plate 200 is extending downwards, while the first flange 540 of the top plate that is opposite to the first flange 530 extends upwards. Suitable washers can also be used with the nuts and the bolts. FIG. 5 shows a nut 520 and a pot magnet 510. One pot magnet can be coupled to one of the two fasteners in an assembly 500 of the top plate and the bottom plate, and two pot magnets may be required for the two assemblies.

Figure 7:
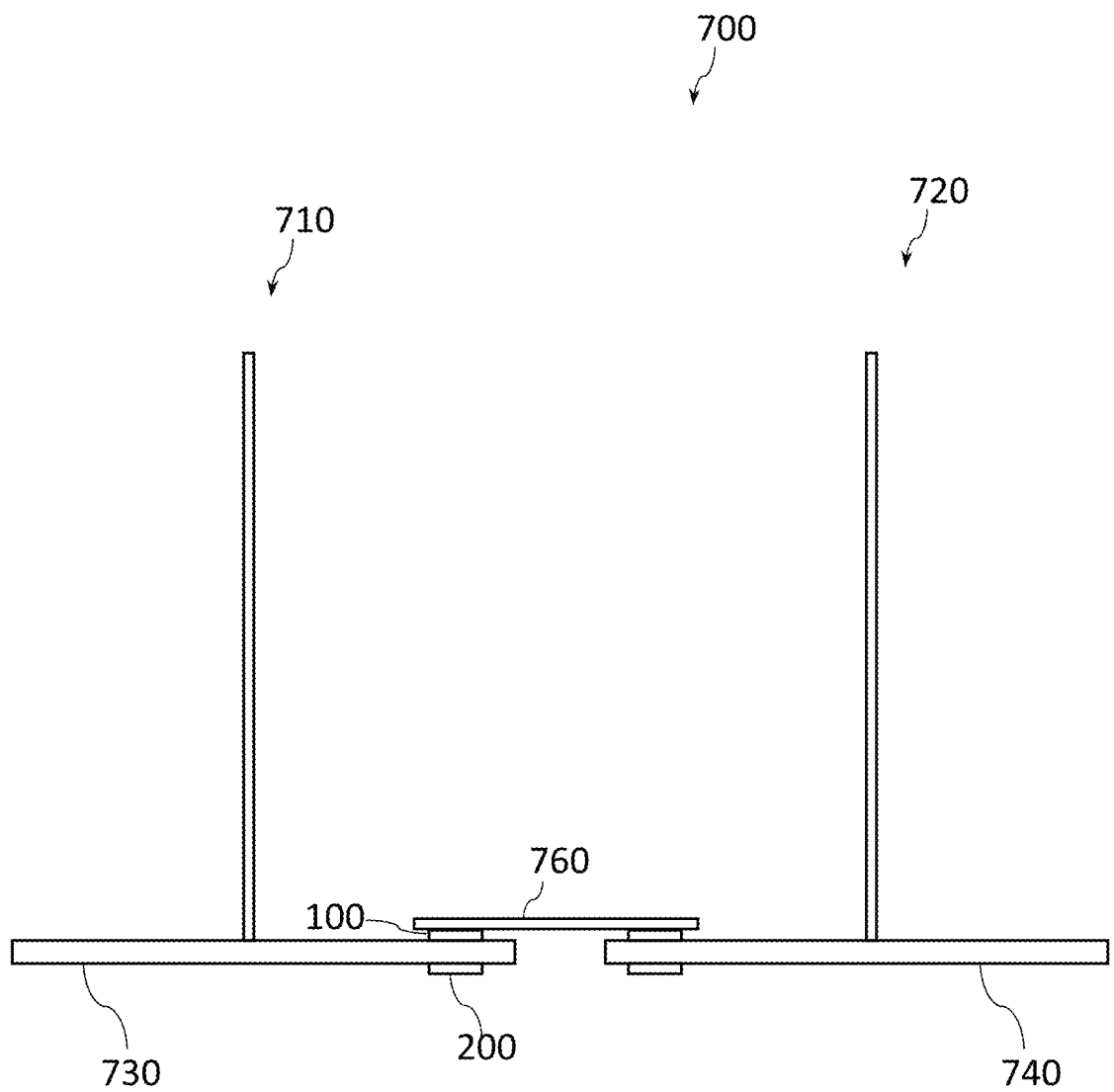
FIG. 7 is a side view of two cleaning mops linked using the coupling apparatus, according to an exemplary embodiment of the present invention.
Figure 8:
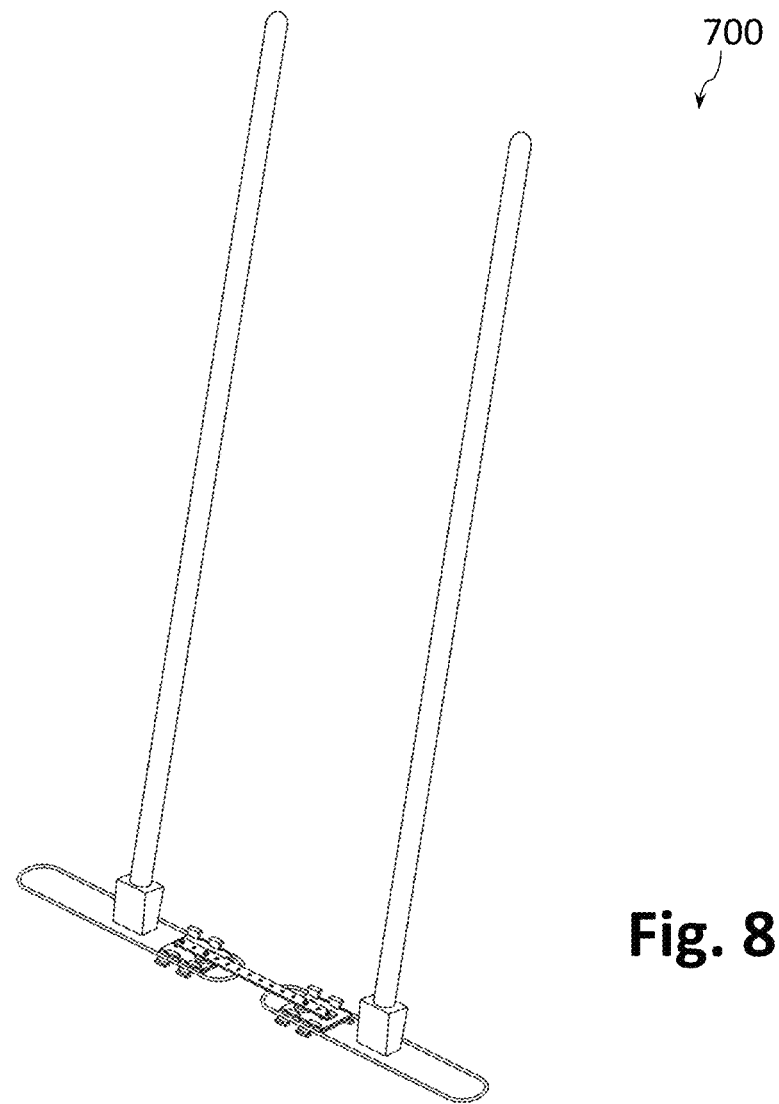
FIG. 8 shows the two linked mops at a different angle, according to an exemplary embodiment of the present invention.
Figure 9:
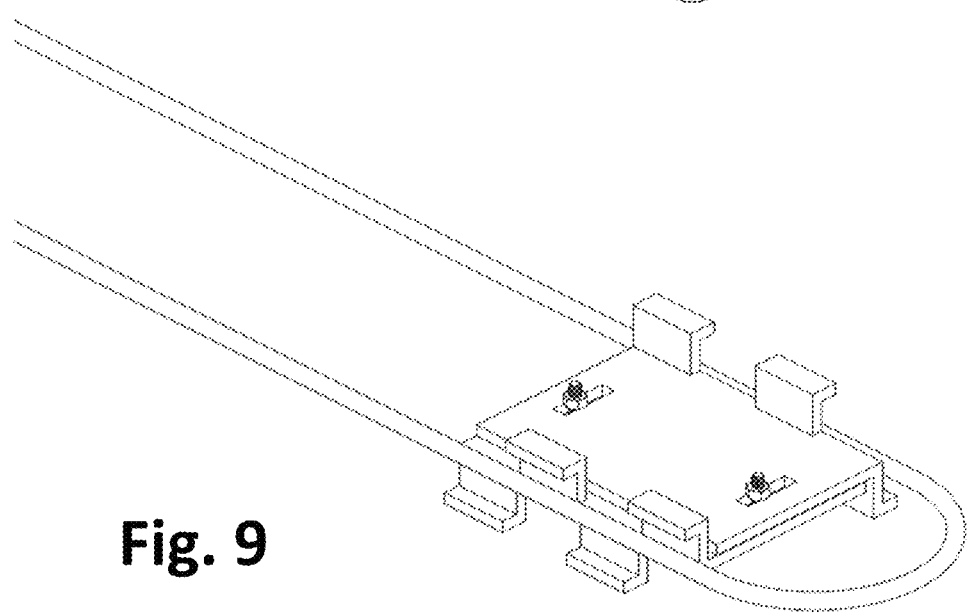
FIG. 9 illustrates the first assembly mounted to a mop head.

Referring to FIG. 7 which shows two mops i.e., a first mop 710 and a second mop 720 both linked together using the disclosed coupling apparatus. The first mop 710 has a mop head 730 for a substantially elongated rectangular shape. The second mop 720 can have a similar mop head 740. The first assembly of the top plate and the bottom plate can be secured to the first mop head 730 and the second assembly of the top plate and the bottom plate can be secured to the second mop head 740. FIG. 7 shows the top plate 100 and the bottom plate 200 clamped to the near end of the mop head 730. A connecting bar 760 made of metal can be positioned over the two top plates, such that the connecting bar 760 can land on the two pot magnets in the two assemblies. FIG. 8 shows how the two mop heads can be pivoted relative to the connecting bar. FIG. 9 shows the first assembly mounted to a mop head.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A coupling apparatus for coupling two cleaning mops, the coupling apparatus comprises a plurality of coupling assemblies, wherein each coupling assembly comprises:
   a top plate, the top plate comprises:
      a first planar member, the first planar member has a front side, a rear side, a left side, and a right side,
      a plurality of first flanges positioned side-by-side on the front side of the first planar member, wherein the plurality of first flanges extends substantially perpendicular from the first planar member, wherein adjacent flanges of the plurality of first flanges extend in opposite directions, and
      a pair of elongated slots in the first planar member, the pair of elongated slots extends between the front side and the rear side of the first planar member, the pair of elongated slots are spaced apart from each other; and
   a bottom plate comprising:
      a second planar member, the second planar member has a front side, a rear side, a left side, a right side,
      a plurality of second flanges positioned side-by-side on the front side of the second planar member, wherein the plurality of second flanges extends substantially perpendicular from the second planar member, wherein adjacent flanges of the plurality of second flanges extend in opposite directions, and
      a pair of slots in the second planar member.

2. The coupling apparatus according to claim 1, wherein the pair of slots in the second planar member is positioned such that when the top plate is mounted over the bottom plate, the pair of slots are below the pair of elongated slots.

3. The coupling apparatus according to claim 2, wherein the top plate is mounted over the bottom plate such that a portion of the first planar member overlays over a portion of the second planar member, and the front side of the first planar member and the front side of the second planar member are away from each other, and the left side of the first planar member and the right side of the second planar member are aligned to each other.

4. The coupling apparatus according to claim 3, wherein a terminal flange of the plurality of first flanges adjacent to the left side of the first planar member and a terminal flange of the plurality of second flanges adjacent to the right side of the second planar member extend in opposite directions.

5. The coupling apparatus according to claim 1, wherein the each coupling assembly further comprises two fasteners configured to secure the top plate to the bottom plate, wherein the two fasteners pass through the pair of elongated slots and the pair of slots respectively.

6. The coupling apparatus according to claim 5, wherein the each coupling assembly further comprises a pot magnet secured to one of the two fasteners.

7. The coupling apparatus according to claim 6, wherein the coupling apparatus further comprises an elongated metallic bar configured to mount over the plurality of coupling assemblies, wherein the elongated metallic bar is configured to be magnetically coupled to the pot magnet.

8. A cleaning apparatus comprising:
   a first cleaning head;
   a second cleaning head;
   a first coupling assembly configured to mount to the first cleaning head;
   a second coupling assembly configured to mount to the second cleaning head; and
   an elongated metallic bar configured to mount over the first coupling assembly and the second coupling assembly for coupling the first cleaning head to the second cleaning head;
   wherein each of the first coupling assembly and the second coupling assembly comprises:
   a top plate, the top plate comprises:
      a first planar member, the first planar member has a front side, a rear side, a left side, and a right side,
      a plurality of first flanges positioned side-by-side on the front side of the first planar member, wherein the plurality of first flanges extends substantially perpendicular from the first planar member, wherein adjacent flanges of the plurality of first flanges extend in opposite directions, and
      a pair of elongated slots in the first planar member, the pair of elongated slots extends between the front side and the rear side of the first planar member, the pair of elongated slots are spaced apart from each other; and
   a bottom plate comprising:
      a second planar member, the second planar member has a front side, a rear side, a left side, a right side,
      a plurality of second flanges positioned side-by-side on the front side of the second planar member, wherein the plurality of second flanges extends substantially perpendicular from the second planar member, wherein adjacent flanges of the plurality of second flanges extend in opposite directions, and
      a pair of slots in the second planar member.

9. The cleaning apparatus according to claim 8, wherein the pair of slots in the second planar member are positioned such that when the top plate is mounted over the bottom plate, the pair of slots are below the pair of elongated slots.

10. The cleaning apparatus according to claim 9, wherein the top plate is mounted over the bottom plate such that a portion of the first planar member overlays over a portion of the second planar member, and the front side of the first planar member and the front side of the second planar member are away from each other, and the left side of the first planar member and the right side of the second planar member are aligned to each other.

11. The cleaning apparatus according to claim 10, wherein a terminal flange of the plurality of first flanges adjacent to the left side of the first planar member and a terminal flange of the plurality of second flanges adjacent to the right side of the second planar member extend in opposite directions.

12. The cleaning apparatus according to claim 8, wherein the each coupling assembly further comprises two fasteners configured to secure the top plate to the bottom plate, wherein the two fasteners pass through the pair of elongated slots and the pair of slots respectively.

13. The cleaning apparatus according to claim 12, wherein the each coupling assembly further comprises a pot magnet secured to one of the two fasteners.

14. The cleaning apparatus according to claim 13, wherein the elongated metallic bar is configured to be magnetically coupled to the pot magnet.

* * * * *